April 12, 1938. O. I. JUDELSHON 2,113,790
DRIVE BELT
Filed April 22, 1936
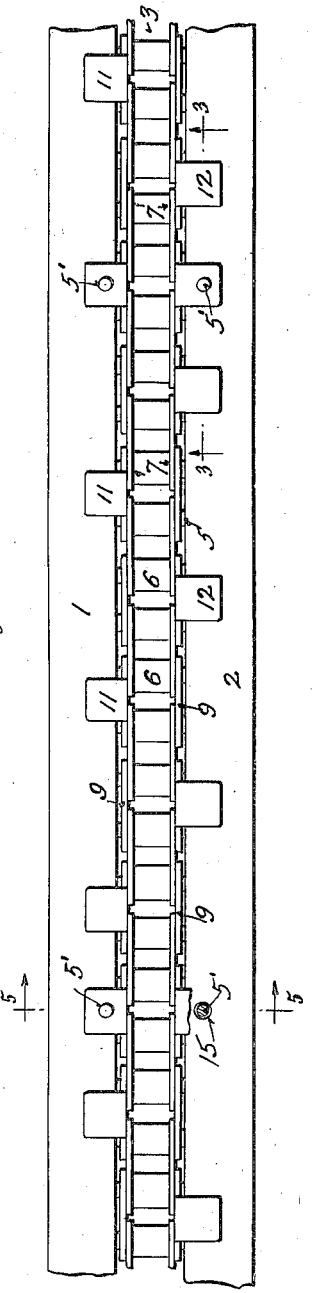
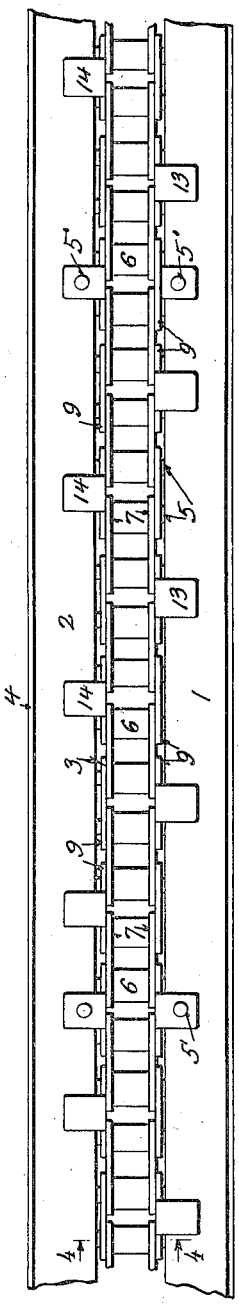
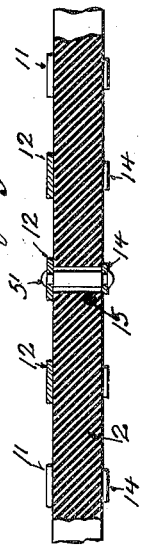
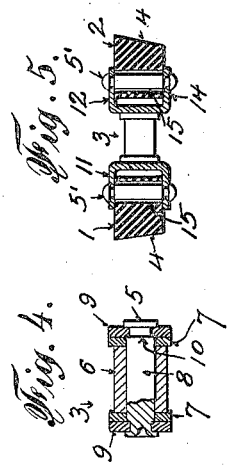
INVENTOR
Oscar I. Judelshon
BY Charles G. Hensley
ATTORNEY Patented Apr. 12, 1938

2,113,790

UNITED STATES PATENT OFFICE 2,113,790

DRIVE BELT

Oscar I. Judelshon, Park Ridge, N. J.

Application April 22, 1936, Serial No. 75,702

3 Claims. (Cl. 74—236)

In my co-pending application Serial No. 50,495, now Patent No. 2,079,351, I showed and described a drive belt of the V type and my present invention is adapted for the same general purposes and it is also adapted to overcome certain disadvantages of the belt shown in said co-pending application.

My present invention relates to drive belts and while it is not necessarily limited to any particular use it is especially advantageous when used in connection with variable speed drive devices. In variable speed drive devices which include expansible pulleys it has been difficult to provide a satisfactory belt, especially where the drive is designed to transmit, say, more than one horsepower. In drives of this character it is common to employ what is known as a V type belt; that is, a belt having its side edges divergent or V shaped to engage between the flanges of a pulley having slanting surfaces, the flanges of the pulley being relatively movable so that the arc of curvature of the belt around the pulley may be increased or decreased to vary the speed ratio as between the driving and driven members.

Where the power to be transmitted is relatively low, say one horsepower or less, it is convenient to use a V type belt made solely of rubber or rubber composition having fabric imbedded therein. However, when greater horsepower is to be transmitted through the drive it is necessary to use a stronger belt and a wider belt and when this becomes necessary other disadvantages are met with.

For instance, if the belt is made only of rubber and fabric and it is made relatively wide, it has a tendency to bend downwardly in the middle, thereby distorting the belt and throwing the side edges out of parallel with the slanting surfaces of the flanges of the pulley so that only a small portion of the edges of the belt actually contact with the frusto conical surfaces of the flanges of the expansible pulley. If the thickness of the belt of this character is increased to gain added strength, it becomes difficult to bend the belt around an expansible pulley of small diameter and the only previous manner of offsetting this was to make the expansible pulleys and the driving and driven pulleys undesirably large in diameter, thereby rendering the whole drive unwieldy.

The object of my invention is to overcome all of these disadvantages by providing a transmitting belt which is the combination of a belt and a chain so designed and constructed that the chain portion provides ample strength for transmitting any desired horsepower and the rubber or pliable portions disposed along the sides of the chain may have V shaped edges engaging the frusto conical surfaces of the expansible pulleys or order that the combined device may serve in the same capacity as an all rubber and fabric belt, but without its disadvantages. With this combination and construction it is possible to provide a belt of reasonable and practical proportions but having much greater strength than a belt consisting only of rubber and fabric. Furthermore, this combination belt even where designed for relatively large horsepower transmission, will readily bend in small arcs so that the expansible pulleys may be made relatively small even where greater horsepower is transmitted. With this combination belt it is not necessary to make the article thick and cumbersome.

Furthermore, the driving and driven pulleys of the variable drive need not be made excessively large where the present belt is employed, and these members may consist partly or entirely of sprocket wheels in order that there will be no slippage as between the belts and the driving and driven members.

The chain is so incorporated and combined with the pliable strips at the opposite sides of it that the device as a whole flexes very readily but it will, nevertheless, be capable of transmitting considerable power relatively to the size of the belt. The present belt is noiseless in operation. Inasmuch as the rubber portions of the present belt are less than if the belt were made entirely of rubber, there is less heating of the belt in operation.

One object of the present invention is to so connect the pliable members at opposite sides of the chain with the chain itself that the pliable members and the chain will be caused to move together and to carry the load in a combined manner by frictional engagement between the pliable members and the chain. In my said co-pending application I showed the chain connected with the pliable members of the belt by means of lateral plates extending from links of the chain and these plates were connected with the pliable members by rivets passing through the pliable member and the lateral plates on the chain.

I have found that where a belt of that character is operated around a pulley of relatively small diameter, that there is a tendency to shear off the rivets. In the present device, instead of depending on the rivets to insure the equal travel as between the chain element and the pliable elements in the present construction I employ a few rivets spaced widely apart lengthwise of the belt and these are disposed through holes in the pliable members which are larger than the shanks of the rivets to allow for play as between the pliable members and the rivets.

The pliable members are pressed laterally against the links of the chain and the friction or traction between the pliable members and the chain causes the chain and pliable members to move in unison rather than depending upon the rivets for this purpose. This prevents the rivets from being sheared even where the belt is caused to move around comparatively small pulleys.

In the present device I employ lateral plates on the chain member, some of which engage the top surface of the pliable members whereas other lateral plates on the chain engage the under surfaces of the pliable members, and these lateral plates are preferably narrower than those which engage the top surfaces of the pliable members in order to permit the pliable members to bend readily around the pulleys.

Another object is to provide pivot pins for the chain which will permit the pliable members to be pressed tightly against the sides of the chain without having the links of the chain bind the anti-friction rollers which are carried by the pivot pins, so that these rollers may turn freely in cases where the belt is caused to travel around a pulley having sprocket teeth. Other features and advantages will be set forth in the following detailed description of my invention.

In the drawing forming part of this application,

Figure 1 is a plan view of a belt embodying my invention,

Figure 2 is an inverted plan view thereof, that is, looking at the inner side of the belt, Figure 3 is a sectional view taken on the line 3—3 of Figure 1, Figure 4 is a sectional view taken on the line 4—4 of Figure 2, and Figure 5 is a sectional view taken on the line 5—5 of Figure 1.

In the drawing I have shown a belt comprising two side members 1 and 2 of pliable material and continuous throughout the length of the belt, and these side members are preferably made of rubber or a composition containing rubber and having fabric incorporated therein, although any of the well known pliable belt materials may be used for the side members. The chain generally designated as 3 is shown in the drawing as consisting of a single row of links but it will be understood that a chain having multiple rows of parallel links such as are shown in my said co-pending application may be used in connection with the present invention, depending upon the load to be carried by the transmitting belt.

The pliable members 1, 2 arranged at opposite sides of the belt have slanting side edges 4 arranged in opposite relation, so that they diverge in relation to each other; and these side edges are adapted to co-operate with frusto conical flange members of a drive, and to understand the manner in which they co-operate with the flange members, reference may be had to my said co-pending application or to the variable speed drive shown in my Patent No. 2,035,269.

The chain illustrated herein is preferably constructed as follows: There are individual cross pins 5 arranged at regular intervals throughout the length of the chain and the anti-friction rollers 6 are mounted to revolve freely on these pins in order to reduce friction where the chain is caused to travel around a pulley having sprocket teeth. At each end of the rollers there are links 7 extending parallel to each other and through opposite ends of which two of the cross pins 5 pass. As shown in Figure 4, the cross pins have a relatively large diameter throughout the major portion of their length, as shown at 8, this larger portion extending through the rollers 6 and through the links 7 terminating flush with the outer surfaces of these latter links.

There are other links 9 each having two of the cross pins 5 extending through apertures in the opposite ends of these links, and these latter links are each disposed in overlapping relation to the first links 7 and they are connected in alternate relation as regards the pins 5 and in relation to the links 7 so that the links 9 combine with the links 7 to form a continuous connection between all of the pins of the chain. This type of chain is not, per se, broadly new in the present case but only insofar as the aforesaid enlargements 8 are concerned.

The pivot pins are reduced in diameter where they pass through the apertures of the outer links 9 and the ends are turned over or peened on the outer surface of the links 9 in order to hold the parts of the chain in assembled relation. It will be noted that the inner faces of the outer links 9 abut against the shoulders 10 of the cross pins so that if pressure is brought laterally against the outer links, these links will not crowd the links 7 against the ends of the rollers with such pressure as to prevent the rollers from revolving freely. In the present case, where lateral pressure is depended upon to cause the pliable members and the chain to move in unison so that all three parts transmit power, the shoulders 10 on the cross pins are desirable to prevent the links from being crowded against the ends of the rollers, as otherwise the rollers would be held from turning.

On one side of the belt a number of the links 9 of the outer row are provided with laterally extending plates 11 disposed at intervals along the length of the belt, which plates engage the outer surface of the pliable member 1. Some of these plates are provided with apertures to receive rivets 5 therethrough as will be further described in detail. The plates 11 are not recessed into the pliable member 1 but simply have a surface contact therewith which will permit local movement of the pliable member in relation to these plates when the belt travels around a pulley.

At the opposite or lower side of the chain in Figure 1 the links 9 at intervals are provided with the laterally extending plates 12 similar to the plates 11 but they are preferably disposed in staggered relation to the plates 11 as shown in Figure 1. Certain of these plates 12 also have apertures therethrough to receive other rivets 5 which pass through these plates and through the pliable member 2 and such plates 11 as have rivets passing through them are preferably arranged opposite to those plates 12 which have rivets passing through them, as shown in Figure 1.

Certain of the links 9 of the chain also have lateral plates 13 which are adapted to engage the under or inner surface of the pliable member 1 and these latter plates are preferably disposed intermediate the plates 11 lengthwise of the belt and they are not imbedded in the pliable member so that local movement of the pliable member may occur adjacent these plates. Some of the plates 13 have rivets passing therethrough and such plates 13 are arranged in the same vertical planes with the plates 11 through which rivets pass. At the opposite side of the belt certain links 9 are also provided with lateral plates 14 which engage the under side of the pliable member 2 and correspond in function with the plates 13. The plates through which the rivets pass are arranged at relatively long intervals lengthwise of the chain.

The apertures 15 formed in the pliable members 1, 2 and through which the shanks of the rivets 5 extend are slightly larger than the shanks of the rivets as shown in Figure 5 in order that there may be slight local movement as between these rivets and the pliable members in order to prevent distortion of the pliable members and to prevent shearing of the rivets, this being one of the features of my invention.

As shown in Figure 3 as well as Figures 1 and 2, the several lateral plates 13, 14 which engage the under sides of the pliable members are of less width than the plates 11, 12 which engage the upper surfaces of the pliable members in order to facilitate the bending of the pliable members when travelling around a pulley.

When the transmitting belt shown and described herein is applied to a drive having a pulley with frusto conical flanges, such as is shown in my said Letters Patent, traction between the belt and the pulley takes place along the slanting or V edges 4 of the pliable members and lateral pressure is exerted against these outer surfaces of the pliable members, so that they are pressed against the ends of the cross pins of the chain as shown in Figures 1 and 2 and in some cases these pliable members may be pressed with such force as to cause them to contact with the links 9 of the chain. As stated above, however, this lateral pressure will not cause the links 9 to be pressed tightly against the ends of the rollers 6 so that these rollers may turn freely.

In the present invention I depend upon this lateral pressure and the friction between the pliable members and the chain caused thereby to compel the chain member and the pliable members to travel together as if they were a unitary structure instead of depending upon the several rivets 5. In this way I overcome the tendency of the rivets to be sheared, especially when the belt is travelling around the pulley. This tendency to shear the rivets is also decreased by the provision of the enlarged apertures 15 where the rivets pass through the pliable members. As the belt as a whole is always subject to the lateral pressure referred to where the belt is engaged with the pulley and which is the location where traction occurs between the belt and the pulleys, the lateral pressure is sufficient to cause the chain and the pliable members to move in unison or at the same speed.

I therefore have the combined strength of the pliable members and the chain member for the transmission of the forces in the drive device.

Having described my invention, what I claim is:

1. A transmitting belt including a chain extending lengthwise of the belt, pliable members extending lengthwise of the belt and disposed on opposite sides of and pressing against the chain and having V shaped outer edges, laterally extending plates on said chain arranged at intervals in the length of the belt, said plates engaging the outer surfaces of said side pliable members, rivets passing through certain of said plates and the adjacent portions of said pliable members to secure the pliable members and plates together, said pliable members having apertures through which said rivets extend of larger diameter than the shanks of the rivets.

2. A transmitting belt including a chain extending lengthwise of the belt, pliable members extending lengthwise of the belt and disposed on opposite sides of the chain and having V shaped outer edges, laterally extending plates on said chain arranged at intervals in the length of the belt and engaging the outer surfaces of said side members, other laterally extending plates on said chain engaging the inner surfaces of said side members, rivets passing through certain of said first and second plates and the adjacent portions of said pliable members, said pliable members having apertures through which said rivets extend of larger diameter than the shanks of the rivets.

3. A transmitting belt including an endless chain extending lengthwise of the belt and being articulate in the direction of the belt, and nonbending laterally thereof, endless pliable members extending lengthwise of the belt and disposed at opposite sides of said chain and pressing against the chain, said side members having V shaped outer edges, said chain having plates arranged at intervals in the length of the belt and extending laterally and engaging against the outer surfaces of said pliable members and having other laterally extending plates engaging against the inner surfaces of said pliable members, the plates engaging the outer surfaces of said pliable members being relatively wider than the plates engaging the inner surfaces of said members, and means for securing said chain and said pliable members together, said means permitting a relatively local movement of said pliable members in relation to said plates and adapted to permit said pliable members and said chain to move in unison by reason of traction caused by lateral pressure between said pliable members and said chain.

OSCAR I. JUDELSHON.